United States Patent
Moiseev

(10) Patent No.: US 7,889,520 B2
(45) Date of Patent: Feb. 15, 2011

(54) DC-DC CONVERTER AND TRANSFORMER

(75) Inventor: Sergey Moiseev, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 439 days.

(21) Appl. No.: 11/872,795

(22) Filed: Oct. 16, 2007

(65) Prior Publication Data
US 2008/0212341 A1 Sep. 4, 2008

(30) Foreign Application Priority Data
Oct. 16, 2006 (JP) ............................. 2006-281180

(51) Int. Cl.
*H02M 3/335* (2006.01)
(52) U.S. Cl. .................... 363/21.04; 336/178
(58) Field of Classification Search .............. 363/21.01, 363/21.02, 21.04, 21.12; 336/178
See application file for complete search history.

(56) References Cited

U.S. PATENT DOCUMENTS

| | | | | |
|---|---|---|---|---|
| 4,544,877 A | * | 10/1985 | Powell | 323/308 |
| 4,547,705 A | * | 10/1985 | Hirayama et al. | 315/219 |
| 5,559,486 A | * | 9/1996 | Ikenoue et al. | 336/90 |
| 5,694,304 A | * | 12/1997 | Telefus et al. | 363/21.03 |
| 5,712,772 A | * | 1/1998 | Telefus et al. | 363/21.02 |
| 5,726,615 A | * | 3/1998 | Bloom | 336/83 |
| 6,023,214 A | * | 2/2000 | Ohta et al. | 336/84 R |
| 6,177,855 B1 | * | 1/2001 | Bouillot et al. | 336/178 |
| 6,314,002 B1 | * | 11/2001 | Qian et al. | 363/21.04 |
| 7,254,046 B2 | * | 8/2007 | Kawasaki et al. | 363/21.12 |
| 7,570,501 B2 | * | 8/2009 | Kawasaki et al. | 363/49 |
| 2003/0067374 A1 | * | 4/2003 | Wu | 336/83 |

FOREIGN PATENT DOCUMENTS

| | | |
|---|---|---|
| JP | 2000-353627 | 12/2000 |
| JP | 2002-057045 | 2/2002 |
| JP | 2003-079142 | 3/2003 |
| JP | 2005-051994 | 2/2005 |
| JP | 2005-051995 | 2/2005 |

* cited by examiner

*Primary Examiner*—Gary L Laxton
*Assistant Examiner*—Yemane Mehari
(74) *Attorney, Agent, or Firm*—Woodcock Washburn LLP

(57) ABSTRACT

A DC-DC converter using a plurality of transformers capable of decreasing the loss, preventing heat generation of transformers, and improving the heat transfer property of the core, and an integrated type transformer used in this DC-DC converter. A terminal T1 in which a negative electromotive force is generated and a terminal TR2 in which a positive electromotive force is generated, while a switching element Q1 is conducting, are connected at a node N1. An output coil L1 and output terminals TO1 and TO2 are provided on a current route shared by transformers T1 and T2. Diodes D1 and D2 are respectively inserted in a forward direction from a node N3 toward a terminal TR3 and in a forward direction from the node N3 toward a terminal TR4. An operation of a first transformer and an operation of a second transformer are respectively assigned to a flyback operation and a forward operation.

6 Claims, 13 Drawing Sheets

US 7,889,520 B2

DC-DC CONVERTER AND TRANSFORMER

CROSS-REFERENCE TO RELATED APPLICATIONS

This application is based upon and claims the benefit of priority from the prior Japanese Patent Application No. 2006-281180 filed on Oct. 16, 2006, the entirety of which is incorporated herein by reference.

FIELD OF THE INVENTION

The invention relates to a DC-DC converter composed of a plurality of transformers, and a transformer integrally formed of a plurality of transformers.

BACKGROUND OF THE INVENTION

FIG. 12 is a basic circuit diagram of dual transformer type DC-DC converter disclosed in Japanese Unexamined Patent Publication No. 2005-51995. A first transformer T101 includes primary windings W101, W102, and a secondary winding W103, and a second transformer T102 includes primary windings W104, W105, and a secondary winding W106. In a period of discharging a capacitor C101 by turning on a main switch Q101, and turning off a sub switch Q102, energy is transmitted from the primary windings W105 and W104 to the secondary winding W106 side, and the primary windings W101, W102 accumulate magnetic energy. On the other hand, in a period of charging the capacitor C101 by turning off the main switch Q101, and turning on the sub switch Q102, energy is transmitted from the primary windings W101 and W102 to the secondary winding W103 side, and the primary windings W104, W105 accumulate magnetic energy.

FIG. 13 shows a structure of a transformer core integrating two transformers used in the DC-DC converter shown in FIG. 12. An I-shaped core 3000 is disposed on an E-shaped core 2000 and a first side wall 2003, and a gap G101 is formed between the I-shaped core 3000 and a center column 2002. Accordingly, a first gap closing magnetic circuit 6000 is formed to pass through the I-shaped core 3000, the first side wall 2003, a bottom plate 2001, the center column 2002, the gap G101, and the I-shaped core 3000. The gap closing magnetic circuit 6000 is a magnetic circuit for the first transformer T101. An I-shaped core 4000 is disposed on the E-shaped core 2000 and a second side wall 2004, and a gap G102 is formed between the I-shaped core 4000 and the center column 2002. Accordingly, a second gap closing magnetic circuit 7000 is formed to pass through the I-shaped core 4000, the second side wall 2004, the bottom plate 2001, the center column 2002, the gap G102, and the I-shaped core 4000. The gap closing magnetic circuit 7000 is a magnetic circuit for the second transformer T102.

Primary windings W101, W104 are formed integrally, and wound around the center column 2002 by a specified number of turns, and similarly primary windings W102, W105 are formed integrally, and wound around the center column 2002 by a specified number of turns. Secondary windings W103, W106 are wound on the center column 2002 reversely by a half turn. Thus, a common transformer is formed by integrating first and second transformers T101, T102. As other related techniques, there are known the DC-DC converters disclosed in Japanese Unexamined Patent Publication Nos. 2005-51994, 2003-79142, 2002-57045, and 2000-353627.

SUMMARY OF THE INVENTION

However, in a conventional DC-DC converter type transformer, gaps G101 and G102 are present respectively in first and second transformers T101 and T102. As a result, the excitation current increases due to gaps G101, G102, and the loss increases. In addition, due to leakage flux flowing out from the gaps G101, G102, an eddy current is induced into the core and winding. As a result, the transformer is heated by loss due to eddy current. In the portion of gaps G101, G102, heat transfer property in the core becomes worse, and additional countermeasure parts of heat release are needed, and the cost is increased and the number of parts is increased.

The invention is devised to solve at least one of the problems of the prior art, and it is hence an object thereof to provide a DC-DC converter using a plurality of transformers capable of decreasing the loss, preventing heat generation of transformers, and improving the heat transfer property of the core, and an integrated type transformer used in this DC-DC converter. In order to achieve the above object, there is provided a DC-DC converter comprising: a first transformer provided with a first core having a gap, the first core being wound around with a first core primary winding and a first core secondary winding; a second transformer provided with a second core having a gap narrower than the gap of the first core or no gap, the second core being wound around with a second core primary winding and a second core secondary winding; a first switching element serially connected to the first core primary winding and the second core primary winding, the first switching element being set in conducting/non-conductive state in a predetermined period; a first rectifier element in which a first polarity terminal is connected to a first terminal of the first core secondary winding that generates an electromotive force of first polarity when the first switching element conducts; a second rectifier element in which the first polarity terminal is connected to a second terminal of the second core secondary winding that generates an electromotive force of second polarity when the first switching element conducts; and an output terminal provided on a current path which starts from a third terminal provided at the opposite side of the first terminal of the first core secondary winding and a fourth terminal provided at the opposite side of the second terminal of the second core secondary winding, and terminates at a connection point of the second polarity terminal of the first rectifier element and the second polarity terminal of the second rectifier element.

The first switching element is changed over between conductive state and non-conductive state in a specified period so as to adjust the output voltage of an output terminal to a predetermined value. At the primary side of the first transformer and the second transformer, the first core primary winding, the second core primary winding, and the first switching element are connected in series. In the first rectifier element, the first polarity terminal is connected to the first terminal of the first core secondary winding for generating an electromotive force of the first polarity when the first switching element conducts. In the second rectifier element, the first polarity terminal is connected to the second terminal of the second core secondary winding for generating an electromotive force of the second polarity when the first switching element conducts. Starting from a third terminal provided at the opposite side of the first terminal of the first core secondary winding and a fourth terminal provided at the opposite side of the second terminal of the second core secondary winding, a route is formed to terminate at the connection point of the second polarity terminal of the first rectifier element and the second polarity terminal of the second rectifier element. An output terminal is provided on this route. At the secondary side of the transformer, an output coil component formed integrally with the transformer is present. This output coil component can be expressed in an equivalent circuit as a coil connected to the secondary winding in serial. A DC-DC converter may be composed by using this coil component, or a DC-DC converter may be formed by using the other independent coil element.

The first transformer and the second transformer may be formed by using separate cores, or by using an integrated core. The first core primary winding and the second core primary winding may be formed of separate and independent windings, or of one integrated winding. When integrated, the number of windings can be decreased, and the primary side structure of the transformer can be simplified.

When the first rectifier element is inserted in a forward direction from the end point of the current route toward the first terminal, and the second rectifier element is inserted in forward direction from the end point of the current route toward the second terminal, the operation is explained, supposing the first polarity to be negative and the second polarity to be positive. When the first switching element is in conductive state, the operation is as follows. At this time, at the secondary side of the first transformer, a negative (first polarity) voltage occurs in the third terminal, and a positive (second polarity) voltage occurs in the first terminal. As a result, a voltage of reverse bias is applied to the first rectifier element, and current does not flow into the first core secondary winding. At the secondary side of the second transformer, a positive (second polarity) voltage occurs in the fourth terminal, and a negative (first polarity) voltage occurs in the second terminal. As a result, a voltage of forward bias is applied to the second rectifier element, and current flows into the second core secondary winding. Consequently, the current flows in the current route in a direction from the third terminal and the fourth terminal toward the end point, and the current is supplied to the output terminal by way of the output coil component. At this time, energy is accumulated in the output coil component.

When the first switching element is in non-conductive state, the operation is as follows. At this time, at the secondary side of the first transformer, a positive (second polarity) voltage occurs in the third terminal, and a negative (first polarity) voltage occurs in the first terminal. As a result, a voltage of forward bias is applied to the first rectifier element, and the first rectifier element conducts, and the energy accumulated in the first transformer is supplied to the output terminal.

At the secondary side of the second transformer, a negative (first polarity) voltage occurs in the fourth terminal, and a positive (second polarity) voltage occurs in the second terminal. As a result, a voltage of reverse bias is applied to the second rectifier element. The first switching element is set in non-conductive state, and a counterelectromotive force occurs in the output coil component, and by this counterelectromotive force, a current flows in the output terminal through the first rectifier element. Hence the energy accumulated in the output coil component is released to the output terminal through the first rectifier element.

Accordingly, at the first transformer side, while the first switching element is conducting, energy is accumulated, and when not conducting, the accumulate energy in the transformer is released, and the flyback operation takes place. At the second transformer side, while the first switching element is conducting, energy is transmitted, and when not conducting, the accumulate energy in the output coil component is released, and the forward operation takes place.

In this manner, the operation of the first transformer is assigned to the flyback operation, and the operation of the second transformer is assigned to the forward operation. In the second transformer responsible for the forward operation, the load current transports energy, and the excitation current is not related to energy transportation. Hence, the energy by the load current only passes through the transformer, and the core is excited only by the excitation current. In the second transformer, therefore, the energy only passes through the transformer, and it is not required to accumulate the energy, and it is not required to reduce the inductance in order to prevent magnetic saturation of the core. Hence, the gap of the second transformer may be set narrower than the gap of the first core, or the gap of the second transformer is not needed. As a result, the number of gap interval can be decreased in the entire transformers, or the total length of the gap interval may be decreased.

The form of the gap is not limited to a state of a part of an annular core being cut apart. By reducing the sectional area in part of the annular core, the magnetic path may be narrowed. Or one gap may be divided into a plurality of small gaps, or multiple tiny gaps may be included in the core, which is known as a dust core. Narrowing of the gap includes, if the plurality of small gaps are formed, a mode of narrowing of total intervals of each gap, or includes, in the case of the dust core, a mode of decreasing the number of tiny gaps in the core. Or by using core materials of different magnetic characteristics in the first transformer and the second transformer, the first transformer and the second transformer may be designed in different inductance values. Thus, in the entire structure of the first and second transformers, excitation current due to gaps can be decreased, and the loss can be reduced. The leakage magnetic flux flowing out from the gap can be decreased, and heat generation of the transformer due to loss by eddy current can be prevented. In the portion eliminating the gap, heat transfer property in the core is improved, and parts for heat release measure can be decreased or may not be needed.

Assignment of the flyback operation and the forward operation in which one of the first transformer and the second transformer differs with the type of the first or second polarity voltage occurring at the secondary side of the transformer, or the polarity direction of the first and second rectifier elements. In this explanation of operation, when the voltage polarity occurring at the secondary side is exchanged, supposing the first polarity to be positive and the second polarity to be negative, the forward operation takes place at the first transformer side, and the flyback operation at the second transformer side. Without exchanging the voltage polarity occurring at the secondary side, when the polarity of the first and second rectifier elements is inverted, too, the forward operation takes place at the first transformer side, and the flyback operation at the second transformer side. The same effects of the invention are obtained if the forward operation takes place at the first transformer side, and the flyback operation at the second transformer side.

Further, there is provided a transformer comprising: a first core having a gap, around which a first magnetic flux loop circulates; a second core having a gap narrower than the gap of the first core or no gap, around which a second magnetic flux loop circulates, the second core having a shared portion in common with the first core; a first winding which is wound on the shared portion; a second winding which is wound on the first core, and together with the first winding, forms a first transformer having the first core as a magnetic core; a third winding which is wound on the second core, and together with the first winding, forms a second transformer having the second core as a magnetic core.

The first core and the second core have a shared portion and thereby formed integrally. The first transformer is composed of the first winding and the second winding, and the second transformer is composed of the first winding and the third winding. The second core of the second transformer has a narrower gap than the gap of the first core of the first transformer, or has no gap.

Accordingly, the first transformer having a gap, and the second transformer having a narrower gap than the gap of the first transformer or no gap can be formed integrally. As a result, the entire transformer structure is reduced in size and weight. As a result, the number of gaps can be decreased, or the total length of the gap interval can be decreased, and the inductance of the coil component formed integrally with the transformer can be increased. Hence, the corresponding coil component can be equivalently used as the output coil, and the output coil is not required to be composed of an independent coil element, and the number of elements can be curtailed.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 5 is a circuit diagram of a DC-DC converter 1a.

DETAILED DESCRIPTION OF ILLUSTRATIVE EMBODIMENTS

Figure 1:
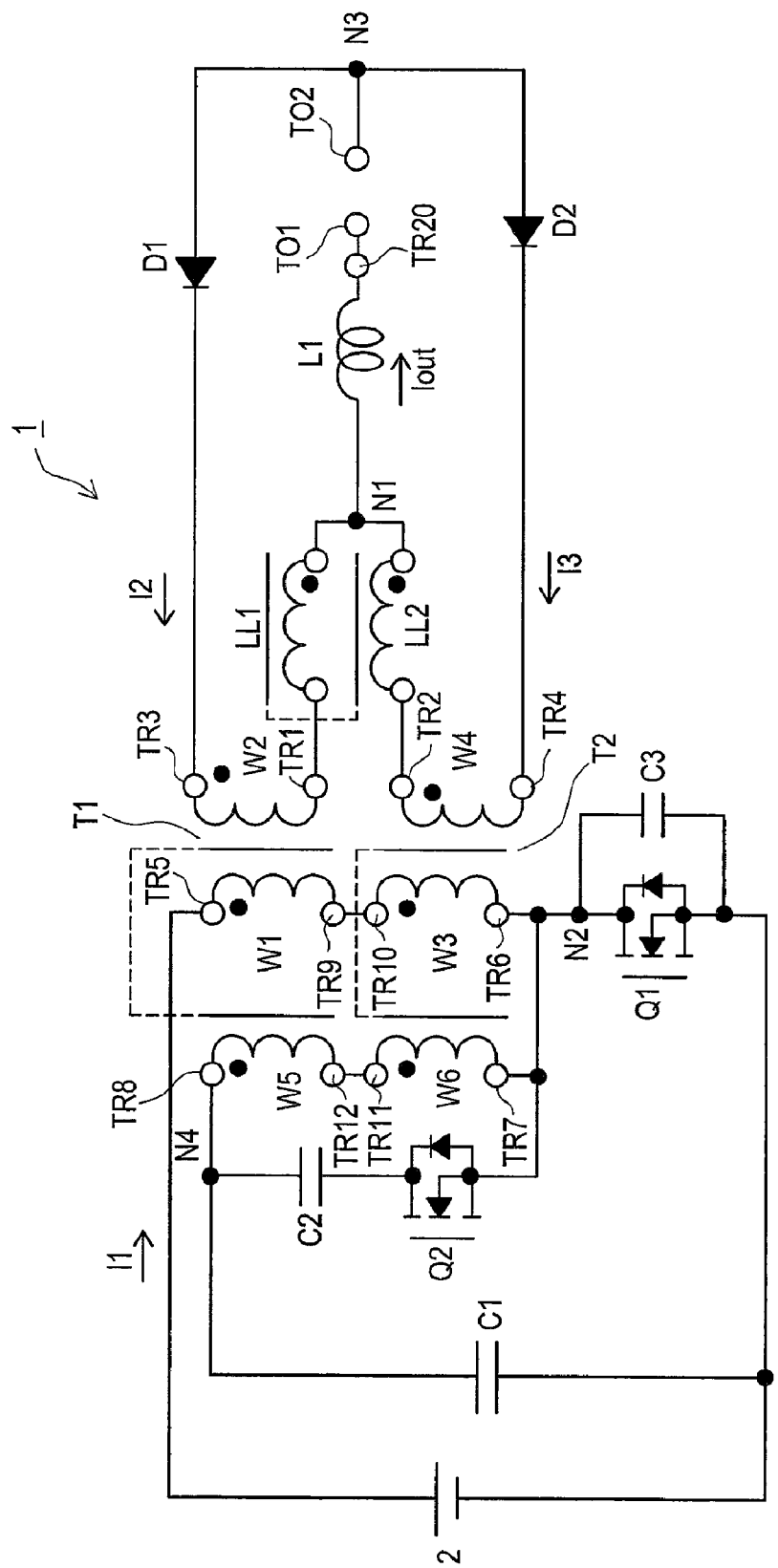
FIG. 1 is a circuit diagram of a DC-DC converter 1.

A specific embodiment of a DC-DC converter of the invention is described below with reference to FIG. 1 to FIG. 3. FIG. 1 is a circuit diagram of the DC-DC converter 1 of a step-down type of the embodiment. The primary side of the DC-DC converter 1 is explained. A terminal TR9 of a first core primary winding W1, and a terminal TR10 of a second core primary winding W3 are connected in series so that the dot marks indicating the polarity may be in the same direction. A terminal TR5 of the first core primary winding W1 is connected to the positive pole of an input direct-current power source 2. A terminal TR6 of the second core primary winding W3, and a drain terminal of a switching element Q1 composed of an NMOS transistor are connected with a node N2. A capacitor C3 is connected in parallel to the switching element Q1. A smoothing capacitor C1 is provided. One end of the capacitor C1 is connected to the negative pole of the input direct-current power source 2 and a source terminal of the switching element Q1, and the other end is connected to a node N4. A first core primary auxiliary winding W5 is wound on the first core in the same number of turns and the same winding direction as the first core primary winding W1, and both are mutually coupled magnetically. Similarly, a second core primary auxiliary winding W6 is wound on the second core in the same number of turns and the same winding direction as the second core primary winding W3, and both are mutually coupled magnetically. A terminal TR12 of the first core primary auxiliary winding W5, and a terminal TR11 of the second core primary auxiliary winding W6 are connected in series so that the dot marks indicating the polarity may be in the same direction. A terminal TR8 of the first core primary auxiliary winding W5 is connected to the capacitors C1 and C2 in the node N4. A terminal TR7 of the second core primary auxiliary winding W6 is connected to the node N2. One end of the capacitor C2 is connected to the node N4, and the other end is connected to a drain terminal of a switching element Q2. A source terminal of the switching element Q2 is connected to the node N2.

The secondary side of the DC-DC converter 1 is explained. The secondary side is provided with a first core secondary winding W2, a second core secondary winding W4, diodes D1 and D2, output coils L1, LL1 and LL2, and output terminals TO1, TO2. The first core secondary winding W2 is provided with terminals TR1 and TR3, and the second core secondary winding W4 is provided with terminals TR2 and TR4. While the switching element is conducting, a negative electromotive force is generated in the terminal TR1 and the terminal TR4, and a positive electromotive force is generated in the terminal TR2 and the terminal TR3. The first core secondary winding W2 and the second core secondary winding W4 are connected in series by way of output coils LL1 and LL2 so that the dot marks indicating the polarity may be in the same direction.

The cathode terminal of the diode D1 is connected to the terminal TR3, and the cathode terminal of the diode D2 is connected to the terminal TR4. Anode terminals of diodes D1 and D2 are connected commonly by way of a node N3. A current route shared by a transformer T1 and a transformer T2 is formed, by starting from terminals TR1 and TR2, and terminating at the node N3. On this current route, the output coils L1, LL1, LL2, and the output terminals TO1, TO2 are provided. Herein, the output coils L1, LL1, LL2 equivalently show the coil components formed integrally with the transformers T1 and T2. One end of the output coil LL1 is connected to the terminal TR1, and one end of the output coil LL2 is connected to the terminal TR2. The other ends of output coils LL1 and LL2 are connected commonly by way of a node N1. At this time, the output coils LL1 and LL2 are coupled mutually to the transformer so that the polarity that the dot marks indicating the polarity may be both at the node N1 side. One end of the output coil L1 is connected to the node N1, and the other end is connected to the output terminal TO1 by way of a terminal TR20.

The structure of the transformers T1 and T2 is explained. The transformers T1 and T2 are formed integrally by using an integrated core. The transformer structure of the integrated core is explained with reference to FIG. 2 and FIG. 3. As shown in FIG. 2, an EE type core is used, in which E-shaped cores 20, 30 are combined so that the mutual magnetic leads may be opposite to each other.

The E-shaped core 20 has an approximately E-shaped cross section, in which a first external magnetic lead 23, a central magnetic lead 22, and a second external magnetic lead 24 are provided parallel on a flat bottom plate 21. A height H1 of the first external magnetic lead 23 is set lower than a height H2 of the central magnetic lead 22 and the second external magnetic lead 24. The E-shaped core 30 is formed similarly in an E-shaped cross section, consisting of a bottom plate 31, a central magnetic lead 32 (not shown), a first external magnetic lead 33, and a second external magnetic lead 34. The central magnetic lead 32, the first external magnetic lead 33, and the second external magnetic lead 34 are formed in the same height. The E-shaped cores 20, 30 are combined so that the mutual magnetic leads may be opposite to each other, so that an EE type core is formed.

The primary winding is wound on the central magnetic leads 22, 32 of the EE type core. The primary winding is wound so that the first core primary winding W1 and the second core primary winding W3, and the first core primary auxiliary winding W5 and the second core primary auxiliary winding W6 may be wound on the central magnetic leads 22, 32 by a specified number of turns.

The secondary winding is wound on the central magnetic leads 22, 32 of the EE type core. The secondary winding is formed of a coil conductor plate 41 formed of a thin conductor plate as shown in FIG. 2. The coil conductor plate 41 is provided with a semicircular coils 45 and 46. A terminal TR20 of the coil conductor plate 41 outputs an output current Iout. The assembled EE type core is placed and fixed on a conductor base plate not shown. The terminal TR20 and the terminal TR3 are connected by way of the base plate, or the rectifier circuit or the other circuit not shown. Similarly, the terminal TR20 and the terminal TR4 are connected by way of the other circuit.

The coil 45 passes through between the first external magnetic leads 23, 33, and central magnetic leads 22, 32. A secondary winding of half turn is formed by the coil 45, and a secondary winding of remaining half turn is formed by a wiring from the terminal TR20 to the terminal TR3 by way of the base plate not shown, and the first core secondary winding W2 of one turn is formed in total. Similarly, the coil 46 passes through between the second external magnetic leads 24, 34, and central magnetic leads 22, 32. A secondary winding of half turn is formed by the coil 46, and a secondary winding of remaining half turn is formed by a wiring from the terminal TR20 to the terminal TR4, and the second core secondary winding W4 of one turn in total is formed.

Figure 2:
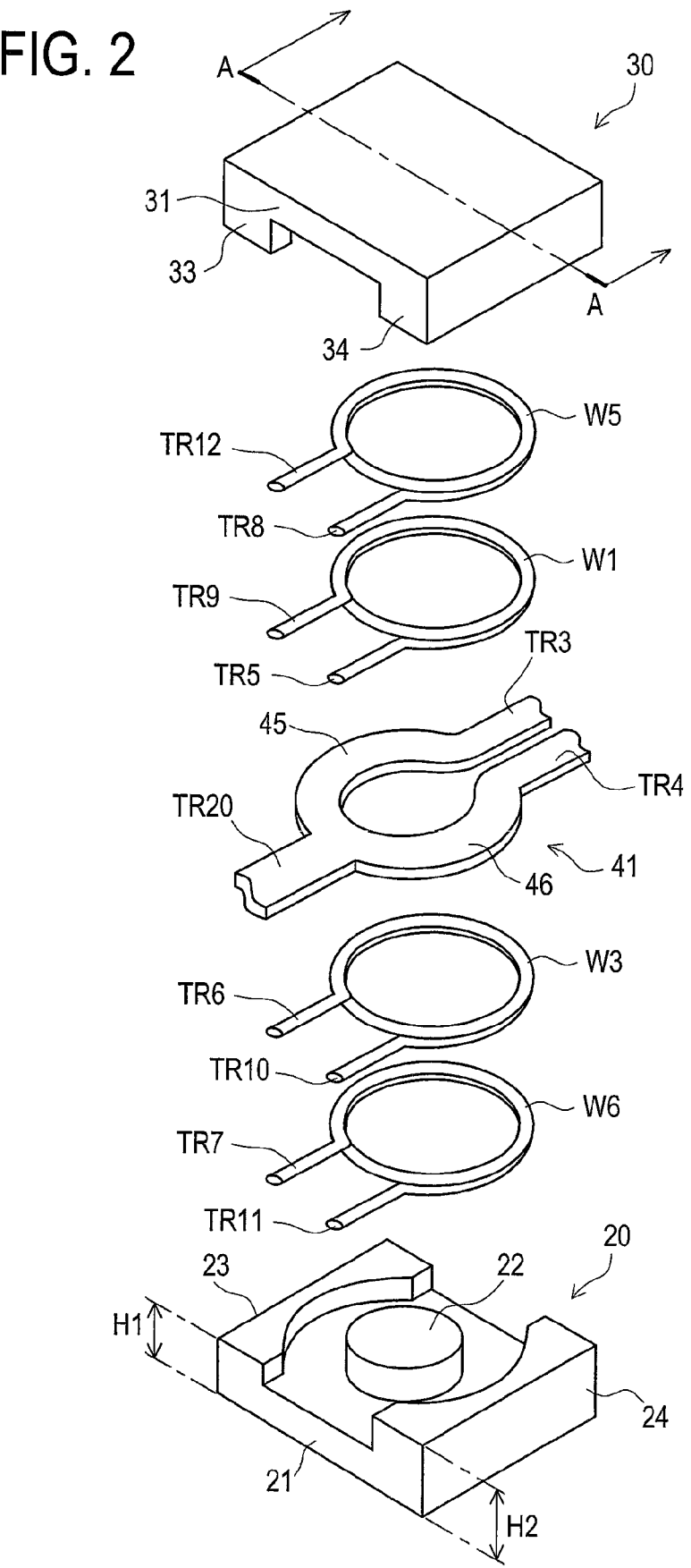
FIG. 2 is a view illustrating a configuration of an integrated type transformer.
Figure 3:
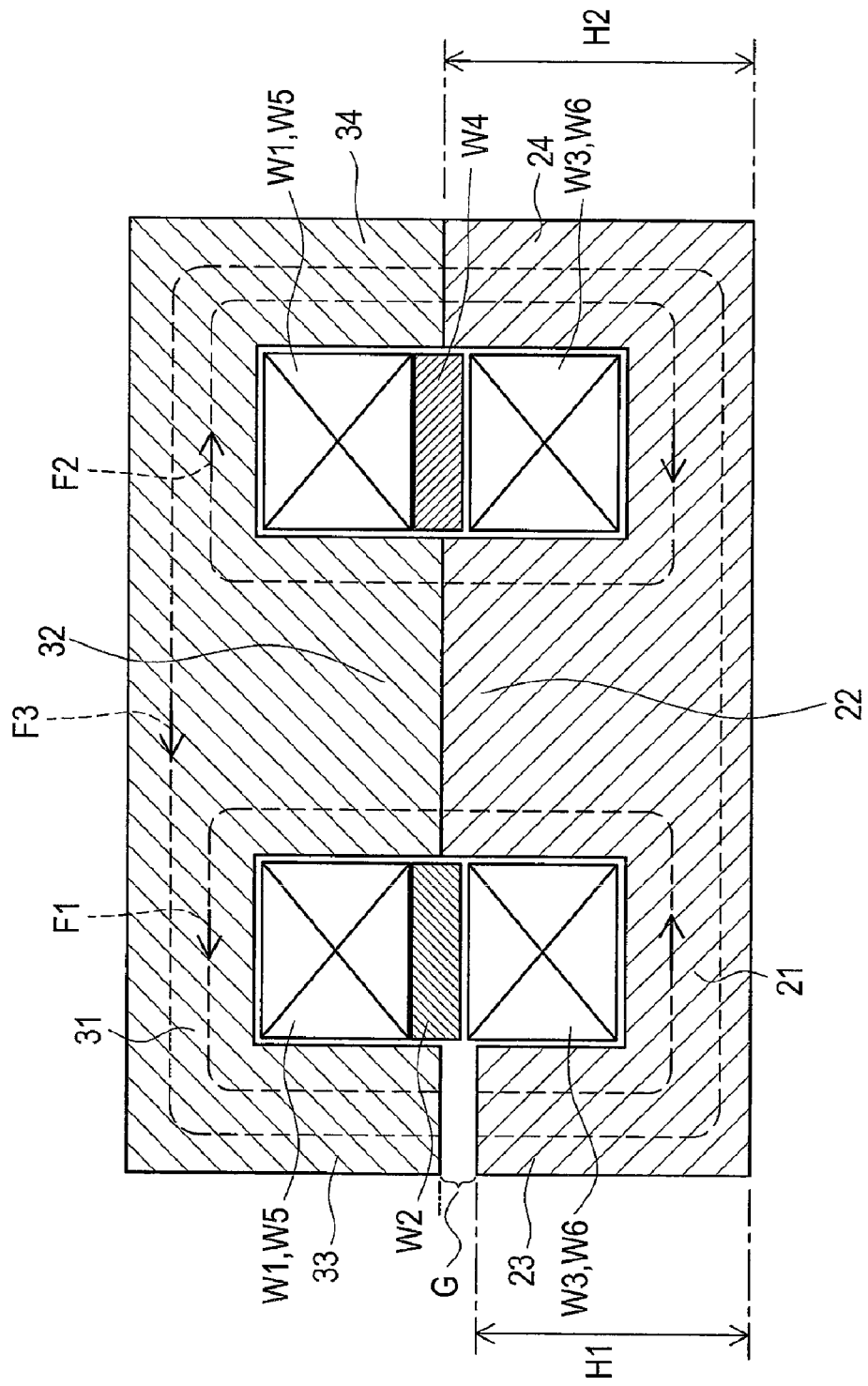
FIG. 3 is a cross-sectional view of the integrated type transformer.

A sectional view in line A-A (FIG. 2) of the assembled transformer is shown in FIG. 3. Since the height H1 of the first external magnetic lead 23 is set lower than the height H2 of the central magnetic lead 22 and the second external magnetic lead 24, a gap G is formed between the first external magnetic leads 23 and 33. The gap G plays the role of preventing magnetic saturation of the core. On the other hand, the gap is not formed between the second external magnetic leads 24 and 34, and between the central magnetic leads 22 and 32. The first core secondary winding W2 and the second core secondary winding W4 are enclosed between the first core primary winding W1 and the first core primary auxiliary winding W5, and the second core primary winding W3 and the second core primary auxiliary winding W6.

The first core and second core share central magnetic leads 22 and 32, and are formed integrally. The first core has a first magnetic flux loop F1 circulating through the central magnetic leads 22 and 32, first external magnetic leads 23 and 33, and gap G. The second core has a second magnetic flux loop F2 circulating through the central magnetic leads 22 and 32 and the second external magnetic leads 24 and 34. By the first core primary winding W1 and the first core secondary winding W2, the transformer T1 is formed, and by the second core primary winding W3 and the second core secondary winding W4, the transformer T2 is formed.

By the output current Iout flowing through the coil conductor plate 41, as shown in FIG. 3, the EE type core has a third magnetic flux loop F3 circulating through the bottom plate 31, first external magnetic leads 23 and 33, the bottom plate 21, and second external magnetic leads 24 and 34. Therefore, on the secondary side common route (FIG. 1) of the DC-DC converter 1, output coils L1, LL1 and LL2 are formed equivalently.

Figure 13:
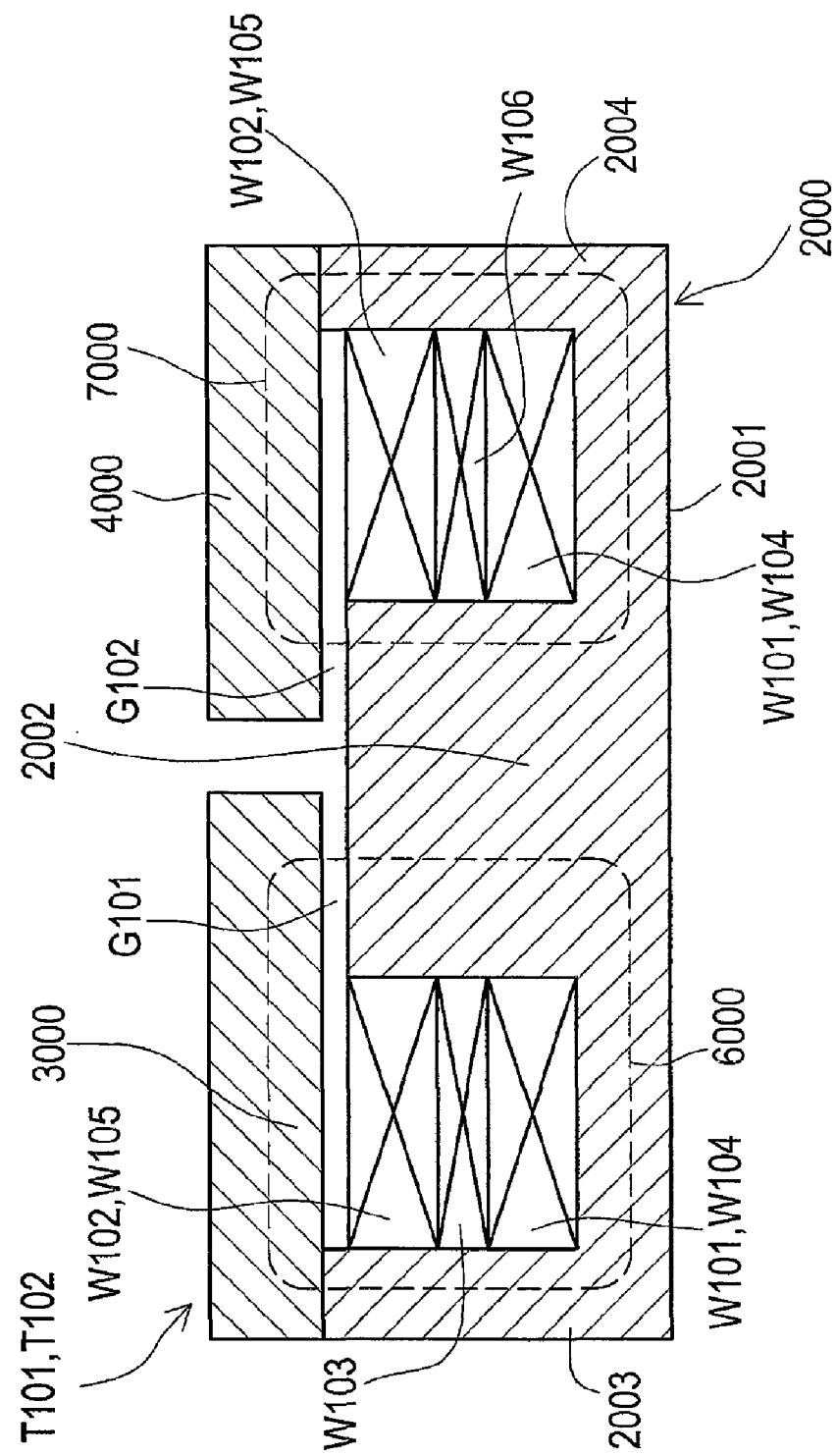
FIG. 13 is a view illustrating a configuration of a transformer core integrating two transformers of conventional art.

In the prior art shown in FIG. 13, the transformer of the DC-DC converter had coil components by magnetic flux loop passing through an I-shaped core 4000, a gap G102, a center column 2002, a gap G101, an I-shaped core 3000, a first side wall 2003, a bottom plate 2001, and a second side wall 2004. However, since two gaps, the gap G101 and the gap G102, are present, the magnetic flux density is lowered, and the inductance of the coil component could not be increased sufficiently. Hence, the coil component formed integrally with the transformer cannot be used equivalently as the output coil, and an extra independent coil element was needed. In the embodiment, on the other hand, the number of gaps can be decreased, and only one gap (gap G) is present on the third magnetic flux loop F3. As a result, the magnetic flux density is higher, and it is possible to increase the inductance of the output coils L1, LL1, LL2 as coil components to be formed integrally with the transformer, and the DC-DC converter can be formed by using the output coils L1, LL1, LL2. It is hence not necessary to compose the output coil by using an independent coil element, and the number of elements can be curtailed.

The circuit operation of the DC-DC converter 1 is explained with reference to FIG. 1. For the sake of simplicity of explanation, first, the explanation starts by ignoring the operation of the transformer resetting circuit having the capacitor C2 and the switching element Q2, and the circuit for continuously passing primary side current having the first core primary auxiliary winding W5, the second core primary auxiliary winding W6, and the capacitor C1.

In the first place, the operation is explained when the switching element Q1 is in conductive state. The operation of the transformer T1 side is explained. When a signal of high level is inputted to the gate terminal of the switching element Q1, and the switching element Q1 conducts, a positive voltage is applied to the dot mark side of the first core primary winding W1 of the transformer T1. At this time, a positive voltage is generated at the dot mark side terminal TR3 of the first core secondary winding W2, and a negative voltage at the node N1 side terminal TR1. As a result, since a reverse bias voltage is applied to the diode D1, no current flows in the first core secondary winding W2.

While the switching element Q1 is conducting, at the transformer T2 side, a positive voltage is applied to the dot mark side of the second core primary winding W3 of the transformer T2. At this time, a positive voltage is generated at the dot mark side terminal TR2 of the second core secondary winding W4, and a negative voltage at the terminal TR4 of the opposite side of the dot mark. As a result, since a forward bias voltage is applied to the diode D2, current I3 flows in the second core secondary winding W4. Since the current I3 is supplied to the output terminals TO1, TO2 by way of output coils L1 and LL2, and the energy is accumulated in the output coils L1 and LL2.

When the switching element Q1 is not conducting, the operation of the DC-DC converter 1 is as follows. The operation of the transformer T1 side is explained. A signal of low level is inputted to the gate terminal of the switching element Q1, and the moment of the switching element Q1 transferring from the conductive state to the non-conductive state, the direction and intensity of the magnetic field is kept the same. Therefore, in order to keep the same ampere-turn as the current I1 flowing in the first core primary winding W1, a negative voltage is generated at the dot mark side terminal TR3 of the first core secondary winding W2, and a positive voltage at the terminal TR1 of the node N1 side. As a result, a voltage of forward bias is applied to the diode D1, and the first rectifier element is set in the conductive state, and current I2 flows, and the energy accumulated in the transformer T1 is supplied to the output terminals TO1, TO2.

Also when the switching element Q1 is not conducting, at the transformer T2 side, a negative voltage is generated at the dot mark side terminal TR2 of the second core secondary winding W4 and a positive voltage at the terminal TR4 of the opposite side of the dot mark. As a result, a voltage of reverse bias is applied to the diode D2, and power is not transmitted from the primary side through the transformer T2. While the switching element Q1 is not conducting, moreover, a counterelectromotive force is generated in the output coil L1, being positive at the output terminal TO1 side, and negative at the node N1 side. Herein, since the output coil L1 is provided on the common route of the diode D1 and the diode D2, if the diode D2 is not conducting, the energy can be released through the diode D1. Hence, by this counterelectromotive force, a current further flows into the output terminal through the diode D1, and the energy accumulated in the output coil L1 is released to the output side. Similarly, the energy accumulated in the output coil LL2 is also released to the output side.

As a result, at the transformer T1 side, while the switching element Q1 is conducting, energy is accumulated, and while not conducting, the accumulated energy is released, and the flyback operation is conducted. At the transformer T2 side, while the switching element Q1 is conducting, energy is transmitted, and while not conducting, the accumulated energy in output coils L1 and LL2 is released, and the forward operation is conducted.

Operation of a transformer resetting circuit having the capacitor C2 and the switching element Q2 is described with reference to FIG. 1. In the transistor T2 conducting the forward operation, when the switching element Q1 is set in the non-conductive state while energy is remaining in the second core primary winding W3, current flows into the capacitor C2 by way of the switching element Q2, and the energy in the second core primary winding W3 is released. As a result, the magnetic flux direction of the second core primary winding W3 is inverted, and it is possible to reset the core of the transformer T2. In relation to the operation of the second core of the transformer T2, the amount of excitation in the ON period of the switching element Q1 is equal to the resetting amount in the ON period of switching element Q2.

The following is the explanation about the circuit, being provided with the first core primary auxiliary winding W5, the second core primary auxiliary winding W6, and the capacitor C1, for supplying the primary side current continuously. When the switching element Q1 is not conducting, the capacitor C1 is charged from the input direct-current power source 2 by way of the first core primary winding W1, the second core primary winding W3, the second core primary auxiliary winding W6, and the first core primary auxiliary winding W5. At this time, the first core primary winding W1 and the first core primary auxiliary winding W5 generate magnetic fluxes in mutually opposite directions, which are canceled. Similarly, the second core primary winding W3 and the second core primary auxiliary winding W6 generate magnetic fluxes in mutually opposite directions, which are canceled. As a result, the route from the input direct-current power source 2 to the capacitor C1 is merely equivalent to a conductor. Hence, the capacitor C1 is charged by the input direct-current power source 2 when the switching element Q1 is not conducting. On the other hand, when the switching element Q1 is conducting, the current flows from the input direct-current power source 2 to the first core primary winding W1 and the second core primary winding W3, and also the current flows from the capacitor C1 to the first core primary auxiliary winding W5 and the second core primary auxiliary winding W6. The effects are explained. If not provided with the first core primary auxiliary winding W5, the second core primary auxiliary winding W6, and the capacitor C1, when the switching element Q1 is not conducting, no current flows from the input direct-current power source 2. As a result, the primary side current is discontinuous, and noise may be occurred. In the DC-DC converter 1 of the invention, however, if the switching element Q1 is not conducting, the charging current flows from the input direct-current power source 2 to the capacitor C1. Hence, even if the switching element Q1 is conducting or not, the current flows from the input direct-current power source 2, and discontinuous flow of the primary side current can be prevented, and it is also possible to lower the peak value of the primary side current.

As described specifically above, according to the DC-DC converter 1 of the invention, the operation of the transformer T1 can be assigned to the flyback operation, and the operation of the transformer T2 can be assigned to the forward operation. In the transformer T2 responsible for the forward operation, only the energy passes through the transformer, and it is not required to accumulate the energy, and it is not needed to increase the saturation current, so that the core gap is not needed. As compared with the prior art requiring gaps in both transformer T1 and transformer T2, in the invention, the gap is required only in the transformer T1, and the number of gaps can be decreased in the entire transformers, or the total length of the gap distance can be reduced.

Hence, in the total of transformers T1 and T2, excitation current due to gaps can be decreased, and the loss can be reduced. It is also possible to reduce the leakage magnetic flux flowing from gaps, and heat generation of the transformer by loss due to eddy current can be prevented. In the portion free from the gap, heat transfer property in the core is improved, and parts for heat release measure may be decreased or omitted.

By eliminating gaps in the transformer T2, the number of gaps existing on the loop of a third magnetic flux loop F3 can be decreased, or the total length of the gap distance can be reduced. Hence, by enhancing the magnetic flux density in the third magnetic flux loop F3, the inductance can be increased in the output coils L1, LL1, LL2 in the equivalent circuit of the coil component formed integrally with the transformer, and hence the DC-DC converter can be composed by using these output coils L1, LL1, LL2. Hence, the output coil is not required to be formed of the independent coil elements, and the number of elements can be curtailed.

Figure 4:
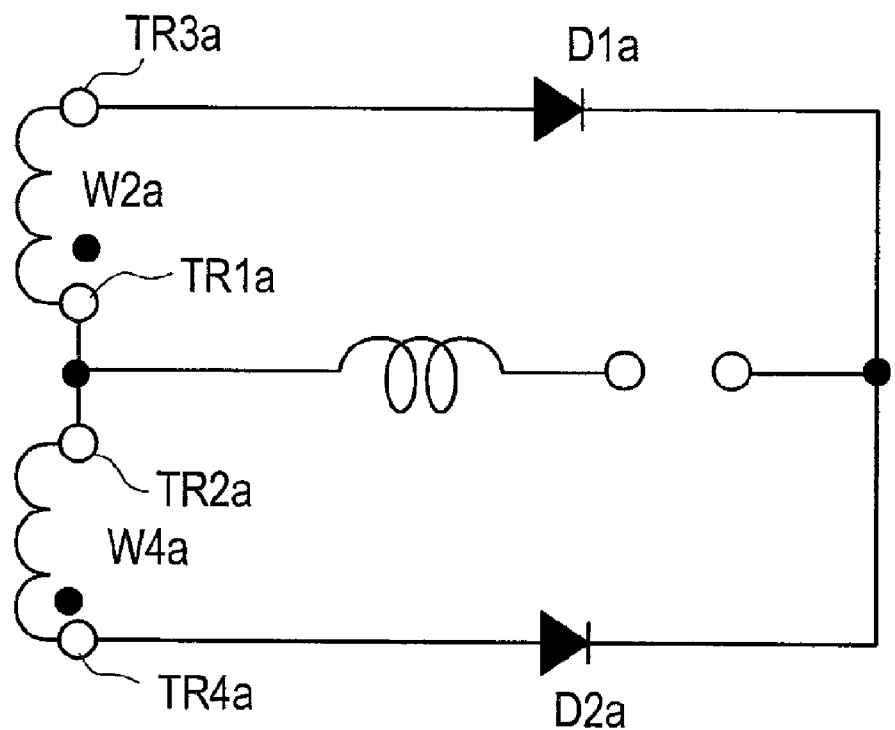
FIG. 4 is a circuitry example of a secondary side of a transformer.

The invention is not limited to the illustrated embodiment alone, but may be changed and modified within a scope not departing from the true spirit of the invention. In the embodiment, as shown in FIG. 1, the winding direction of the secondary winding is the direction of the dot mark coinciding with the terminal TR3 and TR2 side, and cathode terminals of diodes D1 and D2 are connected to terminals TR3 and TR4, but the invention is not limited to this mode. For example, as shown in FIG. 4, the polarity of the secondary winding may be changed over, so that, when the switching element Q1 is conducting, a negative voltage may be generated in the terminal TR3a of the first core secondary winding W2a, and a positive voltage at the terminal TR1a, and that a negative voltage may be generated in the terminal TR2a of the second core secondary winding W4a, and a positive voltage at the terminal TR4a, and by inverting the polarity of diodes D1 and D2 to form diodes D1a and D2a, the operation of transformer T1 may be assigned to the flyback operation, and the operation of transformer T2 may be assigned to the forward operation.

In the embodiment, the operation of the transformer T1 is assigned to the flyback operation, and the operation of the transformer T2 is assigned to the forward operation, but the invention is not limited to this mode. Which one of the transformer T1 and transformer T2 is assigned with the flyback operation or the forward operation depends on the polarity of the voltage generated at the secondary side of the transformer, or the polarity direction of diodes D1 and D2. For example, from the secondary side connection state in FIG. 1, when only the polarity (dot mark direction) of first core secondary windings W2 and W4 is changed over, the transformer T1 is assigned with the forward operation, and the transformer T2 with the flyback operation. Similarly, from the secondary side connection state in FIG. 1, when only the polarity of diodes D1 and D2 is changed over, the transformer T1 is assigned with the forward operation, and the transformer T2 with the flyback operation. The same effects of the invention are obtained if the first transformer is assigned with the forward operation, and the second transformer with the flyback operation.

Figure 5:
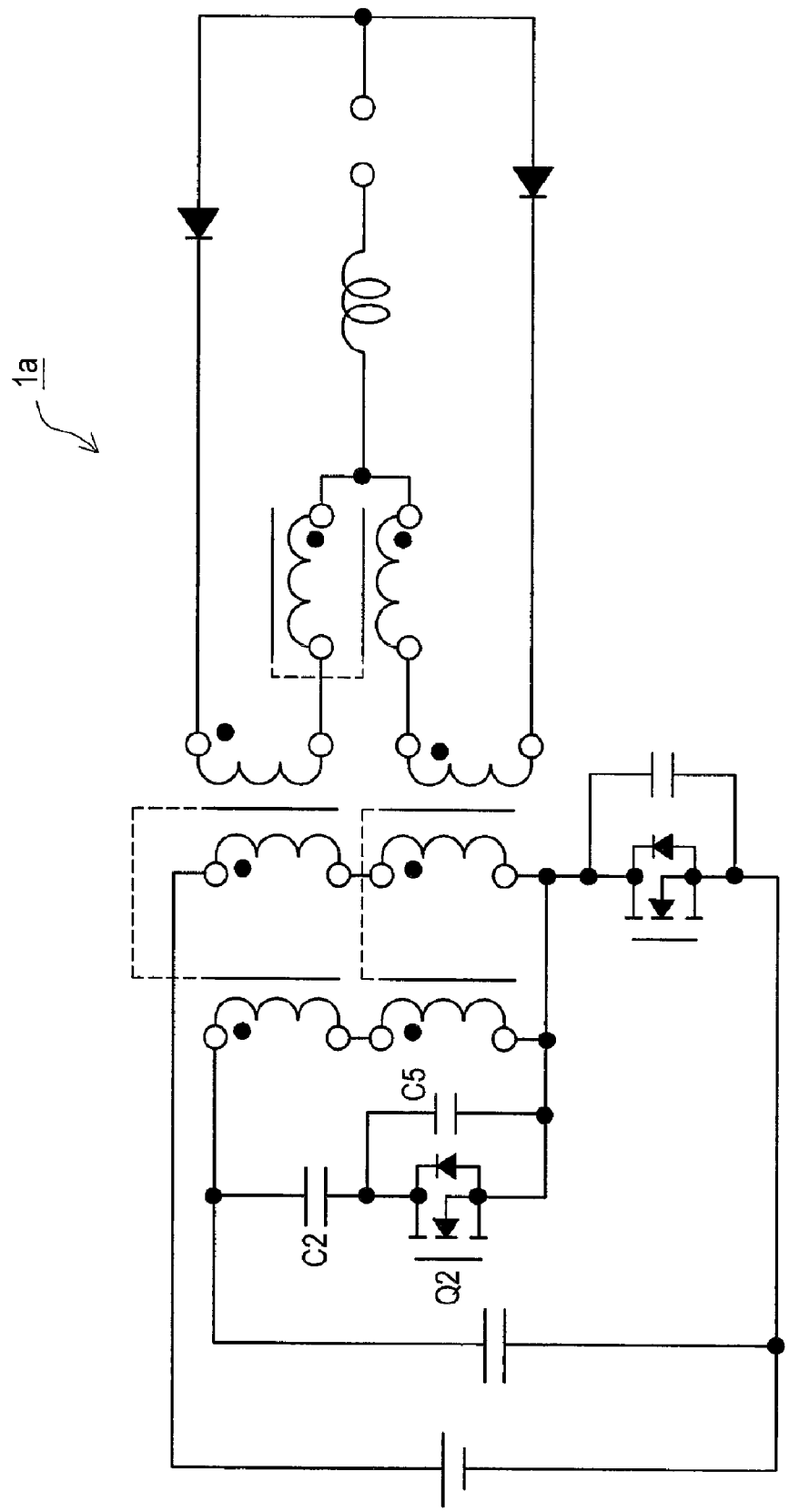

As in the DC-DC converter 1a shown in FIG. 5, a capacitor C5 may be connected parallel to the switching element Q2. In this case, the switching loss of Q2 can be reduced, and parasitic output capacity of the capacitor C5 can replace parasitic output capacity of the switch.

Figure 6:
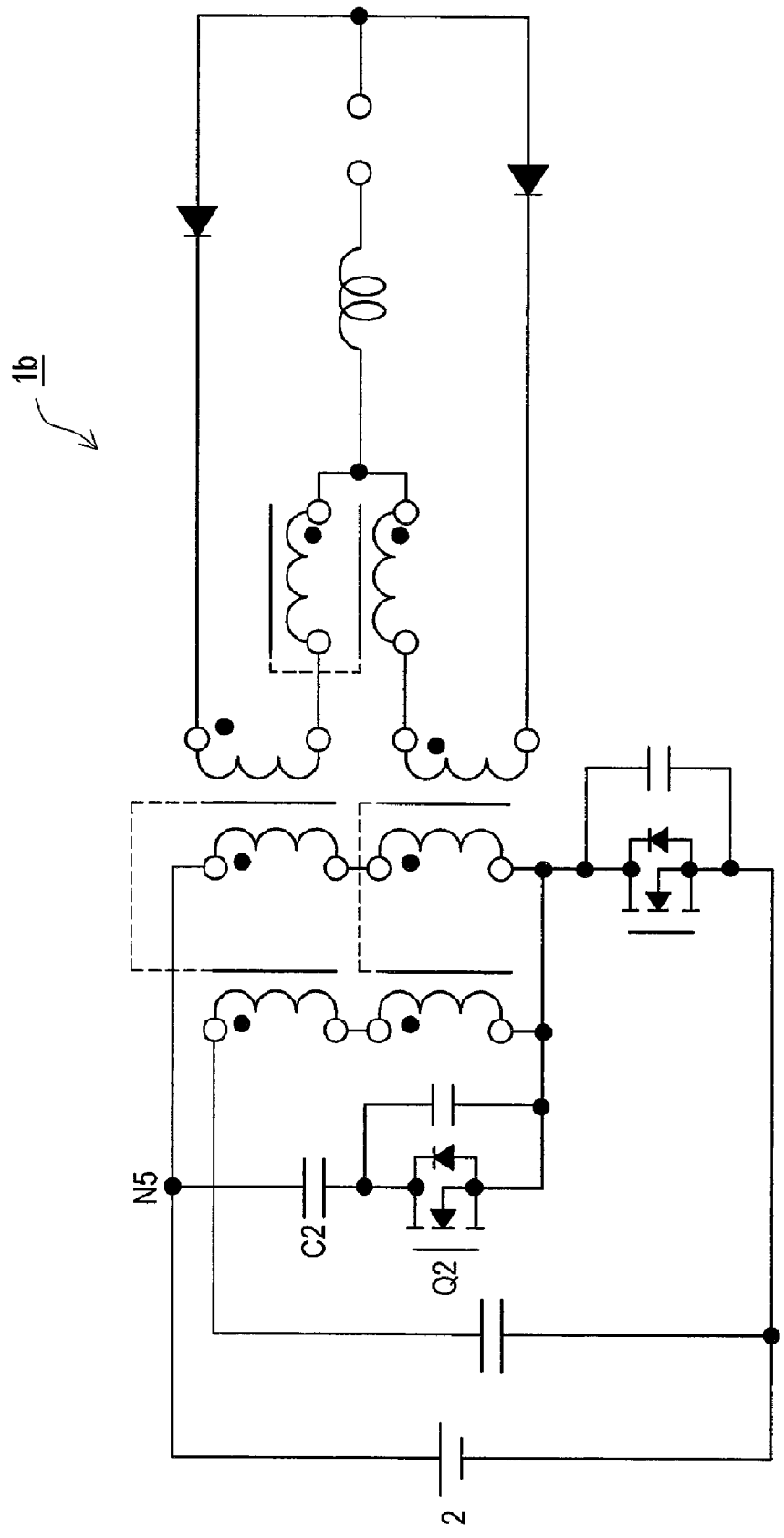
FIG. 6 is a circuit diagram of a DC-DC converter 1b.
Figure 7:
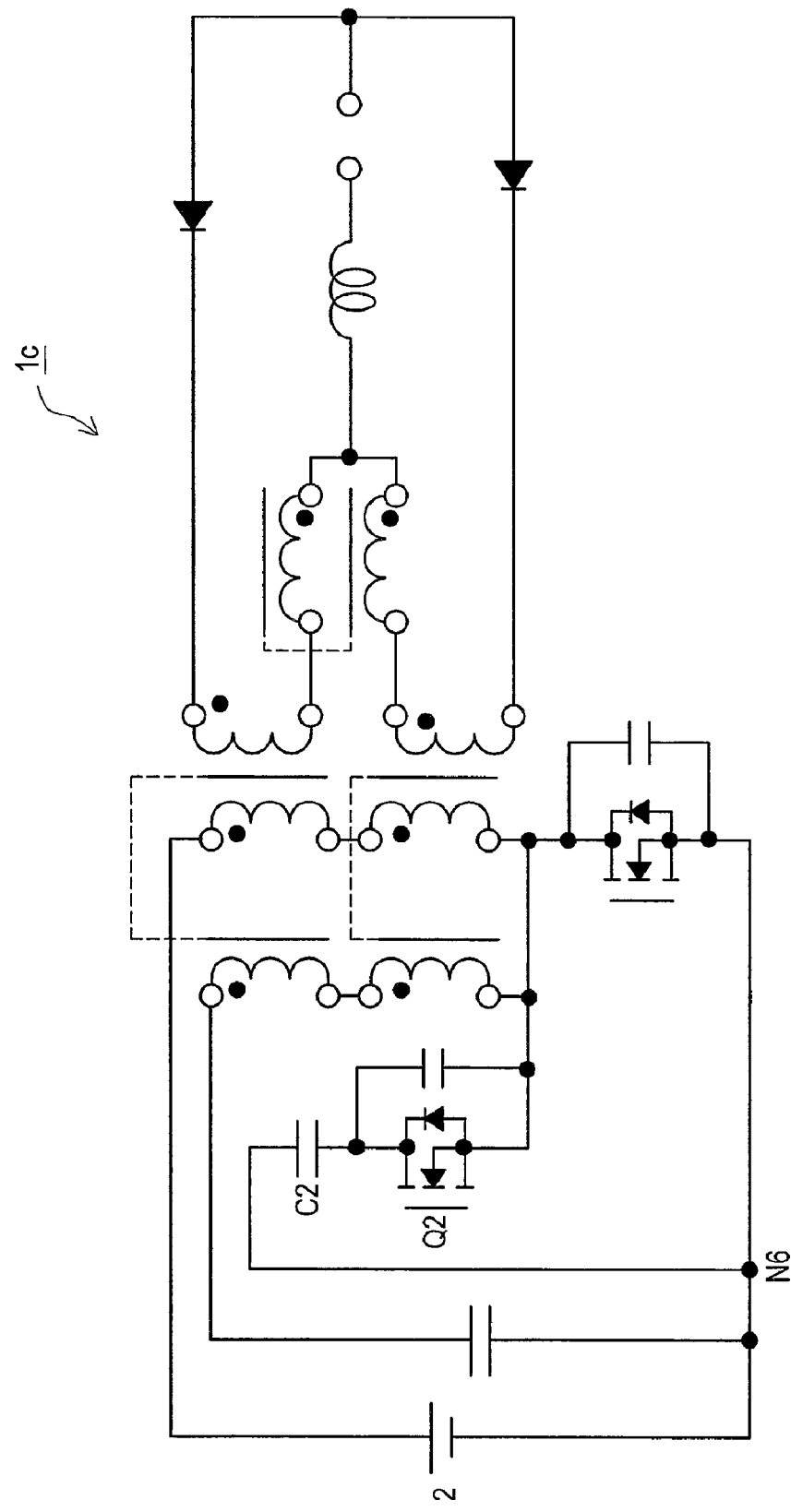
FIG. 7 is a circuit diagram of a DC-DC converter 1c.

As in the DC-DC converter 1b shown in FIG. 6, one end of the capacitor C2 may be connected to the positive pole side of the input direct-current power source 2 by the node N5. Or as in the DC-DC converter 1c shown in FIG. 7, one end of the capacitor C2 may be connected to the negative pole side of the input direct-current power source 2 by the node N6. In these examples, too, by the transformer resetting circuit having capacitor C2 and the switching element Q2, the core of the transformer T2 can be reset. If the input voltage fluctuates, moreover, the voltage applied to the switch can be reduced.

Figure 8:
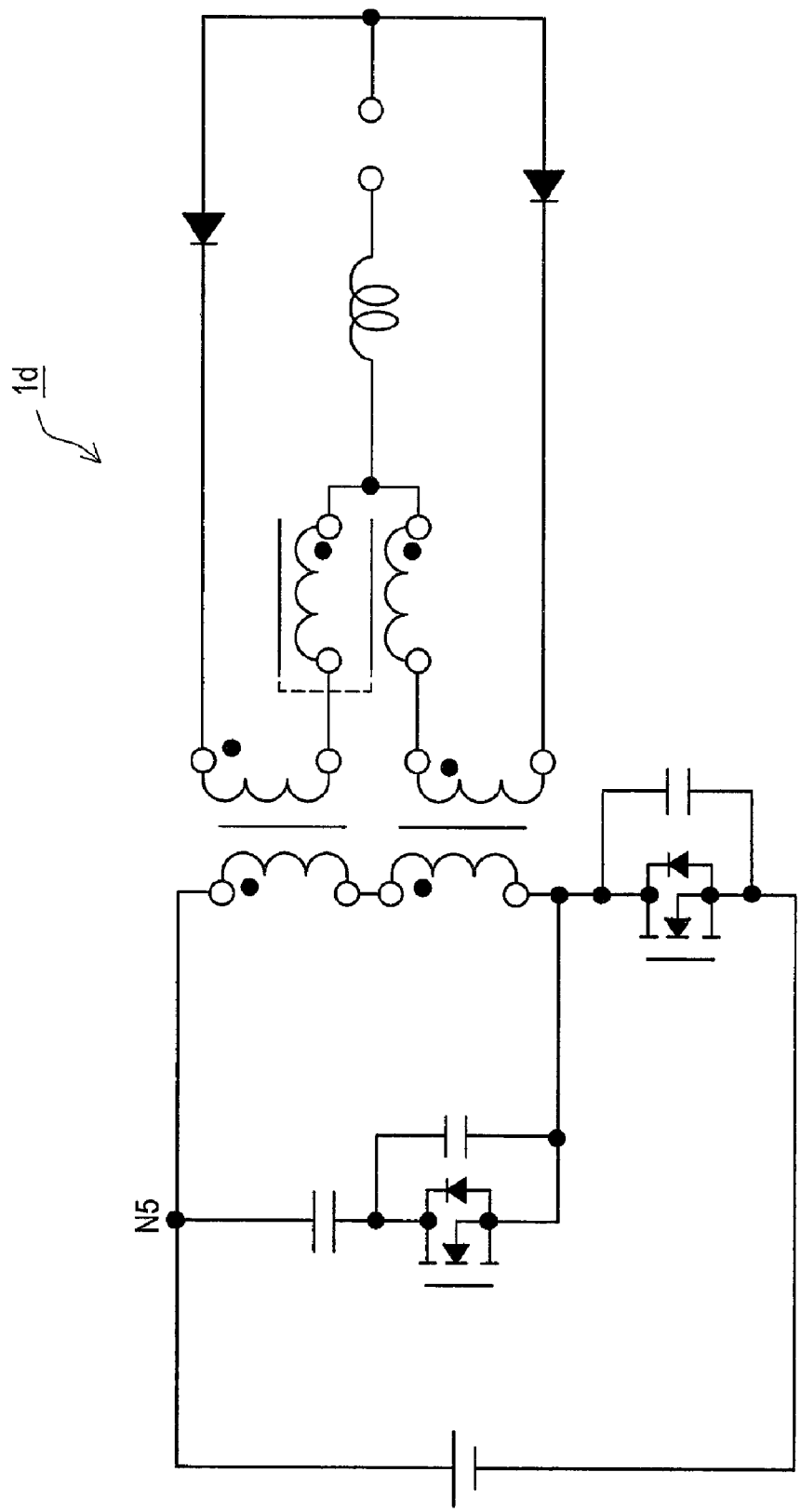
FIG. 8 is a circuit diagram of a DC-DC converter 1d.

As in the DC-DC converter 1d shown in FIG. 8, the circuit (the first core primary auxiliary winding W5, the second core primary auxiliary winding W6, and the capacitor C1) for continuously supplying the primary side current may be omitted from the DC-DC converter 1 in FIG. 1, but the same effects as in the invention are obtained.

Figure 9:
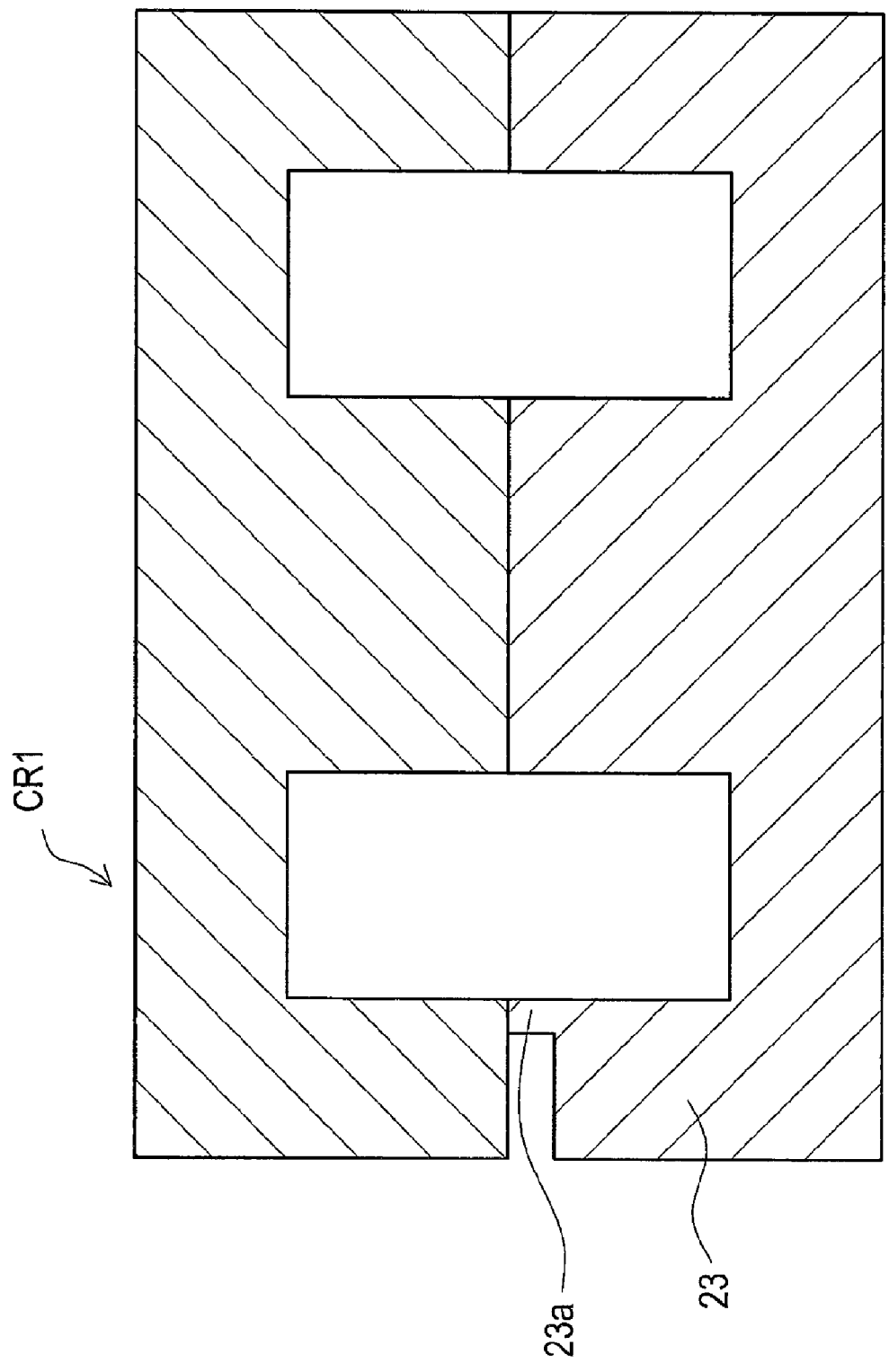
FIG. 9 is a view illustrating a modification example 1 of a form of a gap.

The gap in the core is provided for decreasing the inductance. In other words, it is used for increasing the magneto-resistance of the core. Hence, the mode of the gap is not limited to an example of cutting a part of the annular core as shown in the gap G in FIG. 3, but the mode is not limited as far as the magneto-resistance can be increased. For example, as shown in a narrow magnetic lead 23a in FIG. 9, the gap may be formed by narrowing the magnetic path by reducing the sectional area in part of the first external magnetic lead 23 of the first core CR1.

Figure 10:
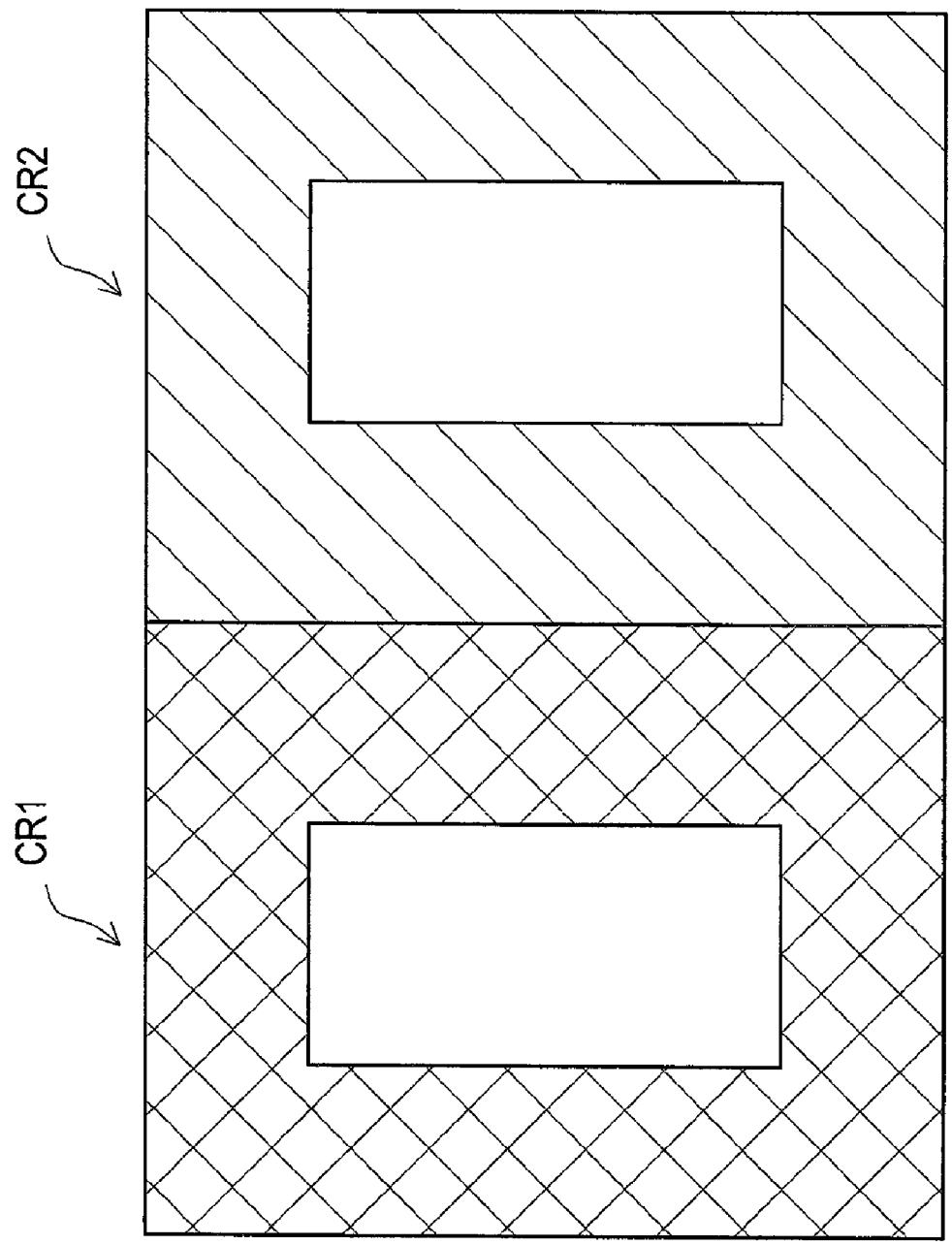
FIG. 10 is a view illustrating a modification example 2 of a form of a gap.

The mode of the gap is not limited to changing of the core shape. The gap is not particularly specified as far as the magneto-resistance can be changed, but the gap can be formed by, for example, changing the materials. For example, as shown in FIG. 10, the first core CR1 may be made of a core material having multiple tiny gaps in the core (so-called dust core), and the second core CR2 may be made of an ordinary core material not having tiny gaps.

Figure 11:
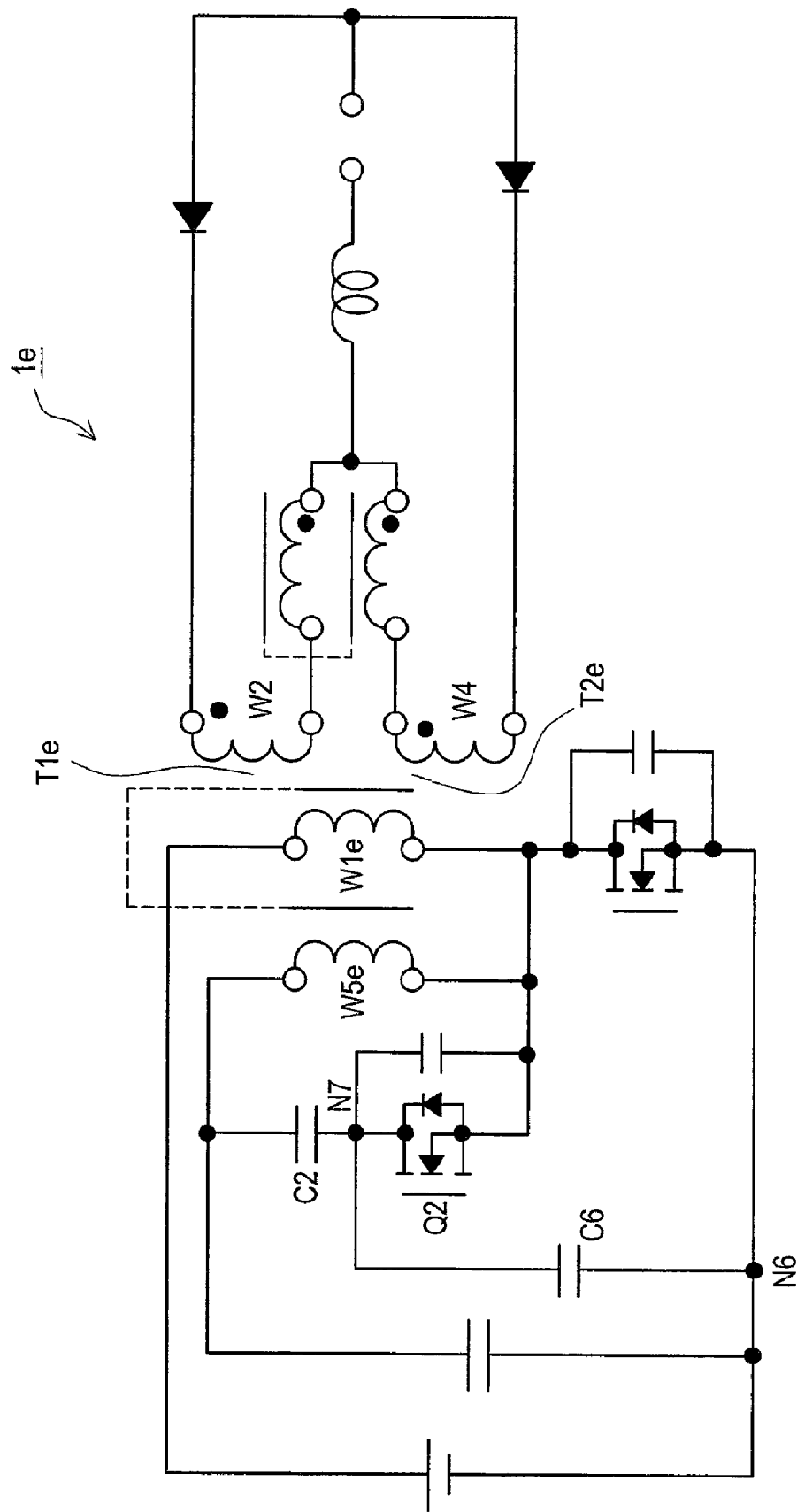
FIG. 11 is a circuit diagram of a DC-DC converter 1e.
Figure 12:
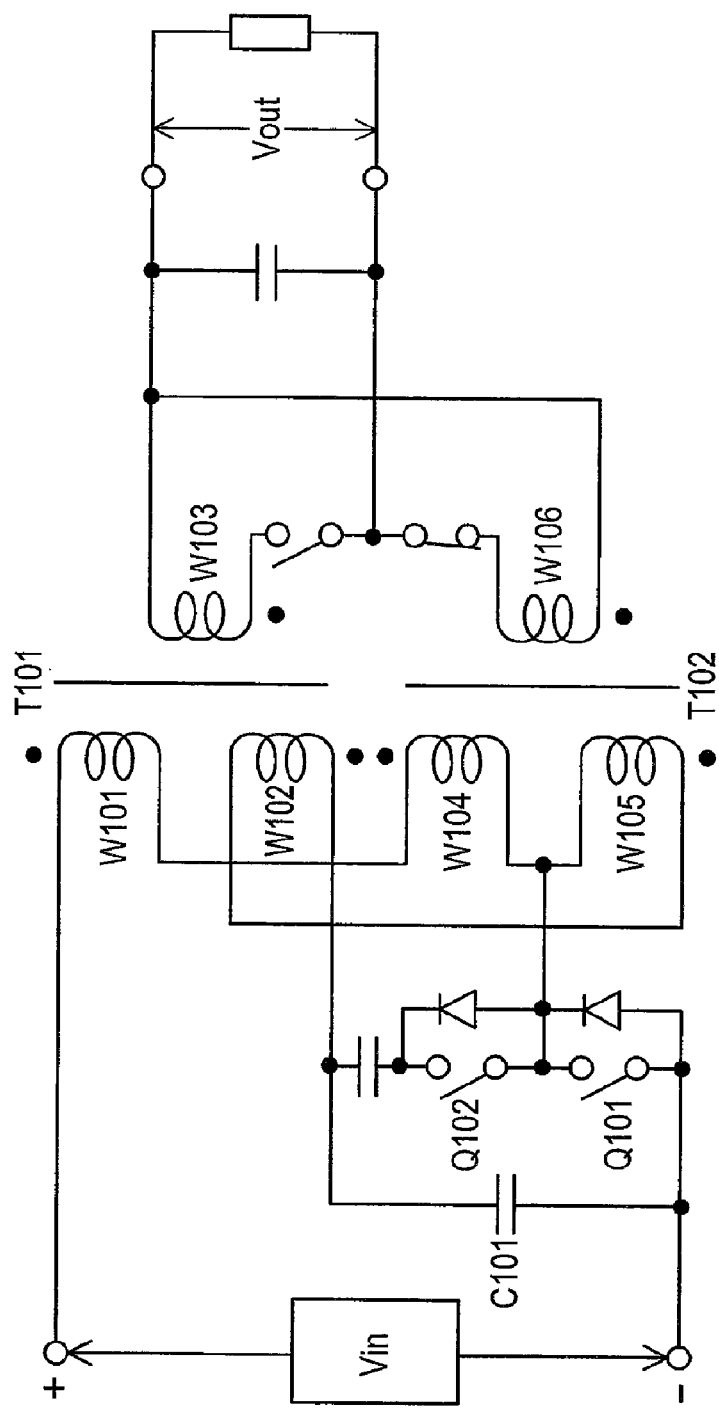
FIG. 12 is a fundamental circuit diagram of a dual transformer type DC-DC converter of conventional art.

In the embodiment, as shown in FIG. 1 and FIG. 2, the primary winding consists of two windings, that is, the first core primary winding W1 and the second core primary winding W3, and the primary auxiliary winding consists of two windings, that is, the first core primary auxiliary winding W5 and the second core primary auxiliary winding W6, but the invention is not limited to this mode. As in the DC-DC converter 1e shown in FIG. 11, instead of the first core primary winding W1 and the second core primary winding W3, a common core primary winding W1e may be used, and instead of the first core primary auxiliary winding W5 and the second core primary auxiliary winding W6, a common core primary auxiliary winding W5e may be used. In a specific structure of the transformer, in FIG. 2, instead of the first core primary winding W1 and the first core primary auxiliary winding W5, one common core primary winding W1e may be wound, and instead of the second core primary winding W3 and the second core primary auxiliary winding W6, one common core primary auxiliary winding W5e may be wound. In this case, by the common core primary winding W1e and the first core secondary winding W2, a transformer T1e is composed, and by the common core primary winding W1e and the second core secondary winding W4, a transformer T2e is composed. As a result, the number of primary windings of the integrated transformer of the invention can be curtailed, and the transformer structure is simplified, and hence the transformer is reduced in size and lowered in cost.

The DC-DC converter 1e has a capacitor C6, in which one end is connected to the negative pole side of the input direct-current power source 2 by means of the node N6, and other end is connected to the capacitor C2 and the switching element Q2 by means of the node N7. Hence, if the input voltage fluctuates, the voltage applied to the switch is reduced, and the surge voltage of the switch is also suppressed.

The switching elements Q1 and Q2 are NMOS transistors as shown in FIG. 1, but may be replaced by other known switching elements such as an IGBT. Similarly, either one or both of diodes D1 and D2 may be replaced by synchronous rectifier elements.

The DC-DC converter according to one aspect comprises: a second switching element provided in a closed circuit including the first core primary winding and the second core primary winding, the second switching element being made to conduct during a period when the first switching element is set in non-conductive state; and a second capacitor element provided in the closed circuit.

As an example, there will be explained an operation when a flyback operation is conducted in the first transformer and a forward operation is conducted in the second transformer. When the first switching element is set in non-conductive state and the second switching element is set in conductive state, while energy is remaining in the second core primary winding, current flows into the second capacitor and the energy in the second core primary winding is released. As a result, the magnetic flux direction of the second core primary winding is inverted, and it is possible to reset the core of the second transformer. Needles to say, if the forward operation is conducted in the first transformer and the flyback operation is conducted in the second transformer, it is possible to reset the core of the first transformer.

The DC-DC converter according to one aspect comprises: a first capacitor element of which one end is connected to a negative pole of an input direct-current power source; a first core primary auxiliary winding wound on the first core in a same number of turns and a same winding direction as the first core primary winding; a second core primary auxiliary winding wound on the second core in a same number of turns and a same winding direction as the second core primary winding, and in the DC-DC converter, one end of the first core primary winding is connected to one end of the second core primary winding; other end of the first core primary winding is connected to a positive pole of the input direct-current power source; other end of the second core primary winding is connected to the first switching element at a first connection point; the first core primary auxiliary winding which is wound in a winding direction that generates magnetic flux in an opposite direction to a magnetic flux generating at the first core primary winding when the first switching element is not conducting, the first core primary auxiliary winding being arranged on a connection path between the first connection point and the first capacitor element; and the second core primary auxiliary winding which is wound in a winding direction that generates magnetic flux in an opposite direction to a magnetic flux generating at the second core primary winding when the first switching element is not conducting, the second core primary auxiliary winding being arranged on a connection path between the first connection point and the first capacitor element.

Since the first core primary auxiliary winding is wound on the first core in the same number of turns and the same winding direction as the first core primary winding, both windings are mutually coupled magnetically. Similarly, since the second core primary auxiliary winding is wound on the second core in the same number of turns and the same winding direction as the second core primary winding, both windings are mutually coupled magnetically. When the first switching element is set in non-conductive state, the first capacitor element is charged from the input direct-current power source by way of the first core primary winding, the second core primary winding, the second core primary auxiliary winding, and the first core primary auxiliary winding. At this time, the first core primary winding and the first core primary auxiliary winding generate magnetic fluxes in mutually opposite directions, which are canceled. Similarly, the second core primary winding and the second core primary auxiliary winding generate magnetic fluxes in mutually opposite directions, which are canceled. As a result, the route from the input direct-current power source to the first capacitor element is merely equivalent to a conductor. Hence, the first capacitor element is charged by the input direct-current power source. On the other hand, when the first switching element is set in conductive state, the current flows from the input direct-current power source to the first core primary winding and the second core primary winding, and also the current flows from the first capacitor element to the first core primary auxiliary winding and the second core primary auxiliary winding.

In this manner, the current flows from the input direct-current power source even if the first switching element is conducting or not. Thus, it is possible to prevent discontinuous flow of the primary side current, thereby preventing noise.

The DC-DC converter according to one aspect comprises a transformer resetting circuit provided with a second switching element which conducts when the first switching element is in non-conductive state and a second capacitor element which is serially connected to the second switching element, and wherein the transformer resetting circuit is connected in parallel to the first core primary auxiliary winding and the second core primary auxiliary winding which are serially connected with each other.

Accordingly, it is possible to reset the core of the second transformer.

In the transformer according to one aspect comprising either one of an EE-type core and EI-type core, the transformer further comprises an E-shaped core which is provided with a first external magnetic lead, a central magnetic lead, a second external magnetic lead disposed in parallel on a flat bottom plate, the E-shaped core being arranged in such a manner that a height of the first external magnetic lead is set lower than heights of the central magnetic lead and the second external magnetic lead, and the central magnetic lead forms the shared portion; the central magnetic lead and the first external magnetic lead forms the first magnetic loop; and the central magnetic lead and the second external magnetic lead forms the second magnetic loop.

After assembled, the EE-type core or the EI-type core are provided with a first core including the central magnetic lead and the first external magnetic lead and a second core including the central magnetic lead and the second external magnetic lead, formed integrally. The height of the first external magnetic lead is set lower than the heights of the central magnetic lead and the second external magnetic lead. Accordingly, a gap narrower than the gap of the first core is formed in the second core, and thus it is possible to compose an integrated type core having gaps of different distance. Alternatively, if the second core is arranged such that no gap is formed therein, the number of magnetic leads having gaps can be curtailed.

According to the invention, the operation of the first transformer can be assigned to the flyback operation and the operation of the second transformer can be assigned to the forward operation. And thereby the number of gaps can be decreased in the entire transformers, or the total length of the gap distance can be reduced. Hence, excitation current can be decreased, and the loss can be reduced. In addition, since the leakage magnetic flux can be reduced, heat generation of the transformer can be prevented. Also, heat transfer property in the core is improved. Furthermore, by integrating the first core having a gap and the second core having no gap, there can be provided an integrated type transformer to be used for the DC-DC converter of the invention. Accordingly, it is possible to achieve miniaturization of transformers and decrease in number of parts.

It is to be noted that the terminal TR3 is one example of the first terminal, the terminal TR4 is one example of the second terminal, the terminal TR1 is one example of the third terminal, the terminal TR2 is one example of the fourth terminal, the node N2 is one example of the first connection point, the switching element Q1 is one example of the first switching element, the switching element Q2 is one example of the second switching element, the diode D1 is one example of the first rectifier element, the diode D2 is one example of the second rectifier element, the capacitor C1 is one example of the first capacitor element, the capacitor C2 is one example of the second capacitor element, the first core primary winding W1 and the second core primary winding W3 are examples of the first winding, the first core secondary winding W2 is one example of the second winding, and the second core secondary winding W4 is one example of the third winding.

What is claimed:

1. A DC-DC converter comprising:
a first transformer provided with a first core having a gap, the first core being wound around with a first core primary winding and a first core secondary winding;
a second transformer provided with a second core having a gap narrower than the gap of the first core or no gap, the second core being wound around with a second core primary winding and a second core secondary winding;
a first switching element serially connected to the first core primary winding and the second core primary winding, the first switching element being set in conducting/non-conductive state in a predetermined period;
a first rectifier element in which a first polarity terminal is connected to a first terminal of the first core secondary winding that generates an electromotive force of first polarity when the first switching element conducts, the first rectifier element being biased in a reverse bias condition;
a second rectifier element in which the first polarity terminal is connected to a second terminal of the second core secondary winding that generates an electromotive force of second polarity when the first switching element conducts, the second rectifier element being biased in a forward bias condition;
a secondary winding connection point to which a third terminal and a fourth terminal are connected, the third terminal being provided at an opposite side of the first terminal of the first core secondary winding and the fourth terminal being provided at an opposite side of the second terminal of the second core secondary winding;
a connection point which connects the secondary polarity terminal of the first rectifier element and the second polarity terminal of the second rectifier element;
a common current path in common with a current path which includes the first core secondary winding and the first rectifier element and a current path which includes the second core secondary winding and the second rectifier element, the common current path connecting the secondary winding connection point and the connection point; an output terminal provided on the common current path; and
an output coil provided on the common current path.

2. The DC-DC converter according to claim 1, comprising:
a second switching element provided in a closed circuit including the first core primary winding and the second core primary winding, the second switching element being made to conduct during a period when the first switching element is set in non-conductive state; and
a second capacitor element provided in the closed circuit.

3. The DC-DC converter according to claim 1, comprising:
a first capacitor element of which one end is connected to a negative pole of an input direct-current power source;
a first core primary auxiliary winding wound on the first core in a same number of turns and a same winding direction as the first core primary winding;
a second core primary auxiliary winding wound on the second core in a same number of turns and a same winding direction as the second core primary winding, and wherein
one end of the first core primary winding is connected to one end of the second core primary winding;
an other end of the first core primary winding is connected to a positive pole of the input direct-current power source;
an other end of the second core primary winding is connected to the first switching element at a first connection point;
the first core primary auxiliary winding is wound in a winding direction that generates magnetic flux in an opposite direction to a magnetic flux generating at the first core primary winding when the first switching element is not conducting, the first core primary auxiliary winding being arranged on a connection path between the first connection point and the first capacitor element; and
the second core primary auxiliary winding is wound in a winding direction that generates magnetic flux in an opposite direction to a magnetic flux generating at the second core primary winding when the first switching element is not conducting, the second core primary auxiliary winding being arranged on a connection path between the first connection point and the first capacitor element.

4. The DC-DC converter according to claim 1 further comprising:
a transformer which is either one of an EE-type and an EI-type, the transformer comprising an E-shaped core which is provided with a first external magnetic lead, a central magnetic lead, a second external magnetic lead disposed in parallel on a flat bottom plate, the E-shaped core being arranged in such a manner that a height of the first external magnetic lead is set lower than heights of the central magnetic lead and the second external magnetic lead,
wherein:
a first magnetic flux loop circulates around the first core through the central magnetic lead and the first external magnetic lead,
a second magnetic flux loop circulates around the second core through the central magnetic lead and the second external magnetic lead,
the first core primary winding and the second core primary winding are wound on the central magnetic lead,
the first core secondary winding passes through between the central magnetic lead and the first external magnetic lead,
the second core secondary winding passes through between the central magnetic lead and the second external magnetic lead, and
together with the first core secondary winding and the second core secondary winding, the output coil forms a third magnetic flux loop which circulates around the first external magnetic lead and the second external magnetic lead.

5. The DC-DC converter according to claim 3, comprising
a transformer resetting circuit provided with a second switching element which conducts when the first switching element is in non-conductive state and a second capacitor element which is serially connected to the second switching element, and wherein
the transformer resetting circuit is connected in parallel to the first core primary auxiliary winding and the second core primary auxiliary winding which are serially connected with each other.

6. A transformer comprising:
an E-shaped core which is provided with a first external magnetic lead, a central magnetic lead, a second external magnetic lead disposed in parallel on a flat bottom plate, the E-shaped core being arranged in such a manner that a height of the first external magnetic lead is set lower than heights of the central magnetic lead and the second external magnetic lead;

a first core, around which a first magnetic flux loop circulates through the central magnetic lead and the first external magnetic lead;

a second core around which a second magnetic flux loop circulates through the central magnetic lead and the second external magnetic lead;

a first winding which is wound on the central magnetic lead;

a second winding which is wound on the first core, and together with the first winding, forms a first transformer having the first core as a magnetic core; and a third winding which is wound on the second core, and together with the first winding, forms a second transformer having the second core as a magnetic core, wherein the transformer comprises either one of an EE-type and an EI-type core.

* * * * *